United States Patent [19]

Nunogaki et al.

[11] Patent Number: 4,814,581
[45] Date of Patent: Mar. 21, 1989

[54] ELECTRICALLY INSULATING CERAMIC SINTERED BODY

[75] Inventors: Naochika Nunogaki, Kariya; Tetsuo Toyama, Anjo; Nobuei Ito; Kazuhiro Inoguchi, both of Okazaki, all of Japan

[73] Assignees: Nippondenso Co., Ltd., Kariya; Nippon Soken, Inc., Nishio, both of Japan

[21] Appl. No.: 106,516

[22] Filed: Oct. 9, 1987

[30] Foreign Application Priority Data

Oct. 9, 1986 [JP] Japan .............................. 61-240490
Sep. 1, 1987 [JP] Japan .............................. 62-218549

[51] Int. Cl.$^4$ .............................................. F23Q 7/22
[52] U.S. Cl. .................................................. 219/270
[58] Field of Search .............................. 219/270, 553; 123/125 A; 252/516, 520

[56] References Cited

U.S. PATENT DOCUMENTS

| | | | |
|---|---|---|---|
| 4,357,526 | 11/1982 | Yamamoto et al. | 219/544 |
| 4,475,029 | 10/1984 | Yoshida et al. | 219/270 |
| 4,486,651 | 12/1984 | Atsumi et al. | 219/553 |
| 4,499,366 | 2/1985 | Yoshida et al. | 219/270 |
| 4,556,780 | 12/1985 | Atsumi et al. | 219/270 |
| 4,598,676 | 7/1986 | Ito et al. | 123/125 A |
| 4,613,455 | 9/1986 | Suzuki et al. | 252/516 |
| 4,633,064 | 12/1986 | Atsumi et al. | 219/270 |
| 4,634,837 | 1/1987 | Ito et al. | 219/270 |
| 4,644,133 | 2/1987 | Atsumi et al. | 219/270 |

Primary Examiner—Clifford C. Shaw
Assistant Examiner—M. M. Lateef
Attorney, Agent, or Firm—Cushman, Darby & Cushman

[57] ABSTRACT

An electrically insulating ceramic sintered body suitably used in a ceramic glow plug, for example, is formed by firing a mixed powder of 75 to 95 vol % of a basic material, 25 to 5 vol % of an additive and a sintering aid. The basic material is composed of at least one material selected from the group consisting of silicon nitride, aluminum nitride, and $\beta$-sialon. The additive is composed of at least one material selected from the group consisting of silicide, carbide, nitride, and boride of metal, the additive having a thermal expansion coefficient larger than that of the basic material. And the sintering aid is composed of one of alumina in an amount of 3 to 50 wt % of the total amount of the basic material and the additive, and spinel in an amount of 2 to 15 wt % of the total amount of the basic material and the additive. The sintered body has the structure that particles of the additive cohere and the cohering additive particles are dispersed in particles of the basic material so as to be surrounded by the particles of the basic material and separated from adjacent cohering additive particles by the particles of the basic material. When the sintered body is used as a heater supporting member of the ceramic glow plug, the thermal expansion coefficient thereof can be controlled in accordance with that of the heater, and a high specific resistance of not less than $10^5 \Omega$ cm can be obtained.

8 Claims, 3 Drawing Sheets

ELECTRICALLY INSULATING CERAMIC SINTERED BODY

BACKGROUND OF THE INVENTION

The present invention relates to a ceramic sintered body applicable to members required to have an electrically insultaing property, and subjected to the repetition of rapid temperature change while joined to metallic members, such as a heater supporting member for a glow plug.

Sintered bodies of silicon nitride(Si$_3$N$_4$), aluminum nitride(AlN), β-sialon[Si$_{6-z}$Al$_z$O$_z$N$_{8-z}$(z=0~4.2)] (hereinafter will be called "sialon"), or the like exhibit low thermal expansion coefficient and accordingly, they have been employed in such uses as to be required to have high thermal shock resistance.

However, it is well known that when these sintered bodies are jointed to metallic members, or when metallic members are embedded in these sintered bodies, thermal stress is formed due to the difference in thermal expansion coefficient between the sintered bodies and the metallic members to generate such heat fatigue in the sintered bodies as to be cracked.

For example, when a sintered body of Si$_3$N$_4$ is used as the heater supporting member for a ceramic glow plug, the supporting member is cracked in its joined portions with a metallic housing which covers the supporting member and with a tungsten wire embedded therein.

Furthermore, in the case where the sintered bodies of different thermal expansion coefficients are joined to each other, they are liable to be cracked.

For preventing such cracks of the ceramic sintered bodies, conventionally, the thermal expansiion coefficient thereof has been controlled by dispersing Al$_2$O$_3$ of which the thermal expansion coefficient is higher than that of the basic material of the ceramic bodies in these ceramic sintered bodies. However, in the above described conventional method, Al$_2$O$_3$ dissolves in Si$_3$N$_4$ in solid phase when sintered to change physical properties of the ceramic sintered bodies. And as the dissolution of Al$_2$O$_3$ in solid phase proceeds, the amount of Al$_2$O$_3$ as high thermal expansion coefficient material is decreased so that thermal expansion coefficient of the obtained sintered body is not so increased as to be expected.

SUMMARY OF THE INVENTION

It is an object of the present invention to provide a ceramic sintered body having a high electrically insulating property and variable thermal expansion coefficient, of which physical properties are not changed due to the solid solution reaction occurring in the firing step.

It is another object of the present invention to provide a ceramic sintered body for a glow plug, which is suitable to a heater supporting member embedding a heater and retained within a metallic housing.

The ceramic sintered body according to the present invention is a sintered body formed of a basic material of at least one out of silicon nitiride, aluminum nitride and sialon, at least one additive selected from the group consisting of silicide, carbide nitride and boride of metal and having a thermal expansion coefficient larger than that of the basic material, and a sintering aid, and has the structure that particles of the above described additive cohere and the cohering additive particles as encircled by a circle A in FIG. 1, are surrounded by particles of the basic material and separated thereby from adjacent cohering additive particles.

As the above described additive, MoSi$_2$, TiC, TiN, ZrB$_2$ or the like can be used, for example.

For obtaining the above described structure, Al$_2$O$_3$ or MgAl$_2$O$_4$, each having low wetting property to MoSi$_2$ and high wetting property to Si$_3$N$_4$, is profitably used as the sintering aid.

The above described sintered body is preferably formed of 75 to 95 vol% of the basic material and 25 to 5 vol% of the additive. And the preferable particle diameter of the basic material is substantially equal to or smaller than that of the additive.

In the sintered body according to the present invention, cohering particles of the electrically conductive additive such as MoSi$_2$ are surrounded by the electrically insulating basic material and separated from adjacent cohering particles as shown in FIG. 1. Therefore, the sintered body according to the present invention exhibits an electrically insulating property.

Furthermore, the sintered body exhibits a thermal expansion coefficient larger than that of the basic material by virtue of the additive.

The additive used in the present invention does not dissolve in the basic material in solid phase when sintered. This results in that physical properties being not varied.

In order to give an electrically insulating property, that is a high specific resistance of $10^5$ Ω.cm or more, to the sintered body, alumina as the sintering aid is added in an amount of 3 to 15 wt% of the total amount of the basic material and the additive, or spinel is added in an amount of 2 to 15 wt% thereof.

A glow plug can be produced by embedding a heater made of tungsten or the like in a supporting member composed of the sintered body according to the present invention. In this case, thermal stress generated in the glow plug can be decreased by regulating the content of the additive in the sintered body so as to bring the thermal expansion coefficient of the sintered body to that of the heater.

Another type of the glow plug can be also produced by joining a heater composed of an electrically conductive ceramic sintered body to a supporting member composed of the sintered body according to the present invention. In this case, it is preferable that the heater is made of such an electrically conductive sintered body as not to generate thermal stress in the joined portions with the supporting member.

This type of the glow plug can be realized, for example, by preparing a supporting member composed of the sintered body according to the present invention, containing Si$_3$N$_4$ as the basic material and MoSi$_2$ as the additive, and by joining a heater composed of a sintered body having the composition equal to that of the supporting member, of which the MoSi$_2$ particle has an average particle diameter sufficiently smaller than that of Si$_3$N$_4$ particle, for example one half or less of that of Si$_3$N$_4$ particle to the prepared supporting member. In this case, the obtained sintered body for the heater has the structure that each of Si$_3$N$_4$ particles is surrounded by MoSi$_2$ particles to be separated from adjacent Si$_3$N$_4$ particles and that MoSi$_2$ particles are serially connected to each other as shown in FIG. 3. This results in electrical conductivity being given to the heater.

In this glow plug, the thermal expansion coefficient of the supporting member is substantially equal to that of the heater. Therefore, thermal stress scarcely occurs in the joined portion between the supporting member and the heater, and accordingly no damage occurs therein.

Furthermore, the supporting member and the heater can be integrally sintered under the most appropriate condition, respectively.

DETAILED DESCRIPTION OF THE EMBODIMENTS

[Embodiment 1]

(1) 82 vol% (70 wt%) of $Si_3N_4$ powder and 18 vol% (30 wt%) of $MoSi_2$ powder, each having various average particle diameter, are mixed with various amount of a sintering aid to prepare mixed powders.

Each of the mixed powders is mixed with a solvent such as ethanol, and stirred. Then, dibutylphtalate as a plasticizer and polyvinyl butyral(polymerization degree: 1000) as a binder are added and kneaded to form a slurry having viscosity of $3 \times 10^4 \sim 10 \times 10^4$ poise. The obtained slurry is subjected to the doctor blade method and dried to form a plurality of ceramic green sheets, each having a thickness of 0.7 mm. These ceramic green sheets are piled and laminated at about 120° C. Then, the laminated sheets are held in an Ar gas at 1700° C. for 30 minutes, and hot pressed under a pressure of 500 kg f/cm to obtain a ceramic sintered body. Thus, ceramic sintered bodies of Sample Nos. 1 through 24 are obtained.

The specific resistance of the obtained ceramic sintered bodies is measured. The measured result is shown in Table 1. As shown in Table 1, the specific resistance can be controlled by changing the particle diameter of $Si_3N_4$ and $MoSi_2$.

However, the electrically insulating property required as the supporting member of the glow plug cannot be obtained only by controlling the particle diameter of $Si_3N_4$ and $MoSi_2$.

The supporting member of the glow plug must have a specific resistance of not less than $10^5$, preferably not less than $10^7$ Ω.cm. As is apparent from Table 1, the above described specific resistance can be obtained by adding not less than 3 wt% of $Al_2O_3$ or not less than 2 wt% of $MgAl_2O_4$ (spinel). In Table 1, marks O show the samples suitable to the supporting member of the glow plug.

(2) Next, the variation of the electrically insulating property and the thermal expansion coefficient due to the variation of the $MoSi_2$ content is examined.

In this case, 8 wt% of $Y_2O_3$ and 4 wt% of $Al_2O_3$ are added as the sintering aid and the specific resistance of the sintered bodies, each containing different MoSi contents, is measured. The result is shown in Table 2 and FIG. 2.

As is apparent from Table 2, when the content of $MoSi_2$ is not more than 25 vol%, preferably not more than 20 vol%, desirable electrically insulating property enough for the supporting member of the glow plug can be obtained.

Figure 2:
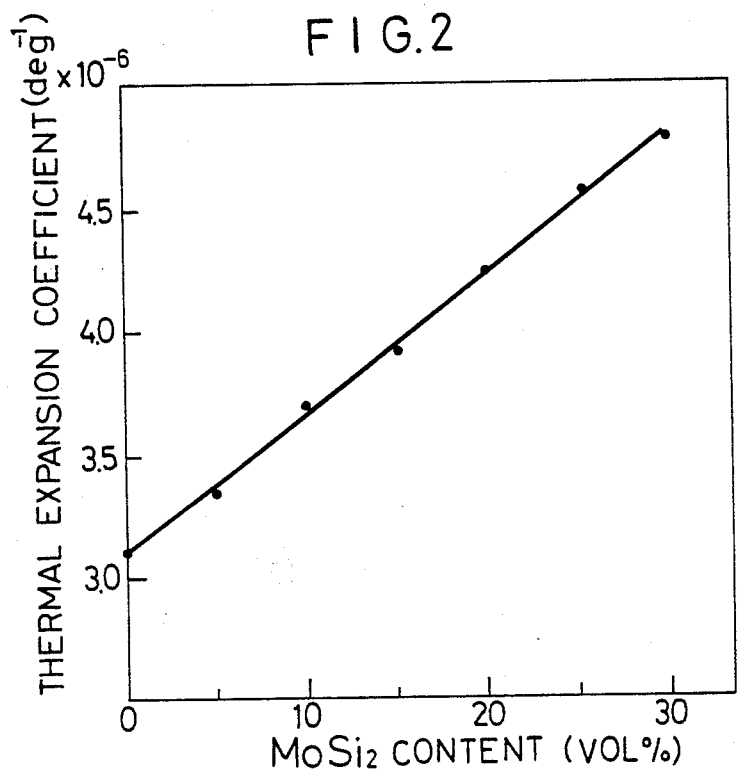
FIG. 2 is a graph showing the relation between the $MoSi_2$ content in the $Si_3N_4$-$MoSi_2$ sintered body and the thermal expansion coefficient.

Furthermore, FIG. 2 shows that the thermal expansion coefficient of the sintered body containing 20 vol% of $MoSi_2$ is $4.2 \times 10^{-6} deg^{-1}$.

When this sintered body is used as the supporting member of the glow plug and tungsten (thermal expansion coefficient: $4.4 \times 10^{-6} deg^{-1}$) is embedded therein, the difference in thermal expansion coefficient between the sintered body and tungsten is as small as $0.2 \times 10^{-6} deg^{-1}$.

In contrast, the difference in thermal expansion coefficient between the sintered body containing no $MoSi_2$, and tungsten is as large as $1.2 \times 10^{-6} deg^{-1}$. This result shows that the difference in thermal expansion coefficient can be reduced by 80% by increasing the $MoSi_2$ content to 20 vol%. And by using such a sintered body as the supporting member of the glow plug, the generation of thermal stress due to the difference in thermal expansion coefficient between the supporting member and tungsten can be remarkably reduced.

[Embodiment 2]

Figure 3:
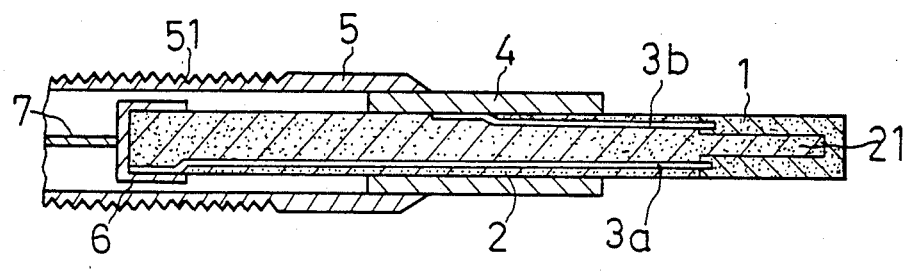
FIG. 3 is a sectional view of one embodiment of a glow plug wherein the sintered body according to the present invention is used as the supporting member for supporting the ceramic heater.

(1) The embodiment where the sintered body according to the present invention is applied to the supporting member of the glow plug is shown in FIG. 3.

As shown in FIG. 3, a plate-shaped projecting portion 21 is formed at a tip end of a rod-shaped supporting member 2 having a rectangular section. A heater 1 having a U-shaped section is formed around the projecting portion 21 so as to cover it. Lead wires 3a and 3b made of tungsten are embedded in the supporting member 2. A tip end of each of the lead wires 3a and 3b is connected to the heater 1. A metallic pipe 4 is attached to an outer periphery of the supporting member 2 and one end of a cylindrical metallic housing 5 is joined to the pipe 4. A rear end of the lead wire 3a extends to the base end of the supporting member 2 and connected to a power source (not shown) through a metallic cap 6 fitted on the base end of the supporting member 2 and a nickel wire 7. A rear end of the lead wire 3b is connected to the metallic pipe 4.

Each of the heater 1 and the supporting member 2 is a sintered body of a mixture composed of 82 vol% (70 wt%) of $Si_3N_4$, 18 vol% (30 wt%) of $MoSi_2$ and additives composed of $Y_2O_3$, $Al_2O_3$ in an amount of 7% and 3%, respectively of the total amount of $MoSi_2$ and $Si_3N_4$. The supporting member 2 and the heater 1 are integrally sintered.

The average particle diameter of the above described $MoSi_2$ powder of each of the supporting member 2 and the heater 1 is 0.9 μm and the average particle diameter of $Si_3N_4$ powder is 0.6 μm in the supporting member 2 and 13 μm in the heater 1.

Figure 1:
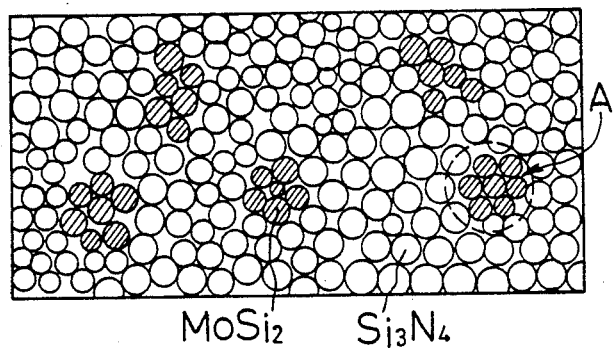
FIG. 1 is a model diagram showing the structure of the sintered body according to the present invention.

The supporting member 2 has the structure that cohered electrically conductive $MoSi_2$ particles are surrounded by electrically insulating $Si_3N_4$ particles so as to be separated from adjacent cohered $MoSi_2$ particles as shown in FIG. 1, and accordingly sufficient electrically insulating property is given to the supporting member 2.

Figure 4:
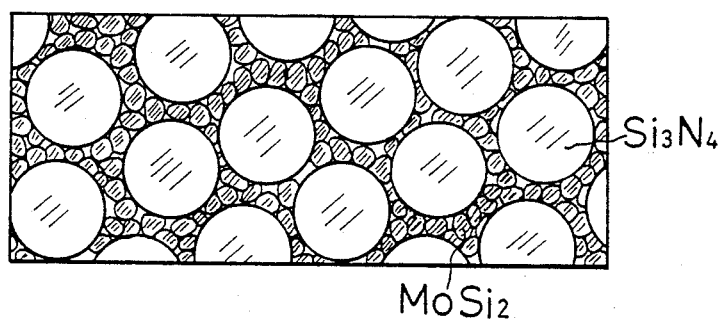
FIG. 4 is a model diagram showing the structure of the ceramic heater used in the embodiment shown in FIG. 3.

The heater 1 has the same composition as that of the supporting member 2 but has the structure that $Si_3N_4$ particles of which the particle diameter is much larger than that of $MoSi_2$ particles, are surrounded by the $MoSi_2$ particles and that the $MoSi_2$ particles are serially connected to each other as shown in FIG. 4, and accordingly, electrical conductivity is given to the heater 1.

The supporting member 2 is connected to the pipe 4 by soldering after the surface of the supporting member 2 is plated with nickel. And the pipe 4 is connected to the housing 5 by soldering.

(2) The glow plug having the above described structure, of which the supporting member 2 is integrally sintered with the heater 1 by hot pressing at 1560° to 1760° C. under 500 kg/mm$^2$ in an Ar gas of 1 atmosphere pressure, was examined on the thermal shock resistance and the joining strength of the supporting member 2 with the pipe 4. And for comparison, similar tests were conducted to the glow plug of which the supporting member 2 is made of 55 vol% of $Si_3N_4$ and 45 vol% of $Al_2O_3$.

The thermal shock resistance was estimated by the spalling test. Namely, voltage is supplied to the glow plug so as to be kept at a predetermined temperature. Then, the tip end portion projecting from the pipe 4 is immersed in a water of 20° C. Cracks generated in the surface of the glow plug were examined.

The joining strength was estimated by the pressure applied to the heater 1 in the direction of the pipe 4 when the heater 1 is fallen into the pipe 4.

The experimental result is shown in Tables 3 and 4. In Table 3, x marks show the generation of cracks.

As is apparent form Table 3, cracks are not observed in each of samples according to the present invention. The thermal expansion coefficient of the sintered body composing the supporting member 2 is very similar to that of the lead wires 3a and 3b made of tungsten, which is embedded in the supporting member 3, and the heater 1 and the supporting member 2 are made of the same material as each other. This results in the thermal stress caused by the difference in thermal expansion between the supporting member 2 and the lead wires 3a,3b and between the heater 1 and the supporting member 2 being remarkably small, and accordingly the thermal shock resistance being excellent.

Furthermore, as is known from Table 4, the joining strength of the sample according to the present invention is much higher than that of the comparison sample. This result shows that the joining strength of the supporting member 2 to the metallic pipe covering the supporting member 2, is remarkably increased according to the present invention. This results from that $MoSi_2$ which is easily connected to Ni is dispersed in the supporting member 2 to improve the cohesion property of the nickel plating to the supporting member 2.

(3) Various firing conditions and properties of the sintered body of 82 vol% $Si_3N_4$+18 vol% $MoSi_2$+7 wt% $Y_2O_3$+3 wt% $Al_2O_3$ (composing the supporting member and the heater of the above described embodiment) and those of the sintered body of 55 vol% $Si_3N_4$+45 vol% $Al_2O_3$ (composing the supporting member of the above described comparison sample) were tested. The test result is shown in Table 5.

As is apparent from Table 5, the strength of the sintered body of 55 vol% $Si_3N_4$—45 vol% of $Al_2O_3$ is rapidly decreased at a firing temperature of over 1600° C. It has become clear that this decrease in strength results from that the reaction of $3Si_3N_4+2Al_2O_3 \rightarrow 2Si_4Al_2O_2N_6+SiO_2$ proceeds and accordingly $SiO_2$ as the surplus component is deposited on the intergranular layer. This result shows that the firing temperature should be not more than 1600 C. for obtaining strength enough to the supporting member.

In contrast, the sintered body $Si_3N_4$—$MoSi_2$ is more difficult to be sintered than $Si_3N_4$—$Al_2O_3$, and not less than 1640° C., preferably not less than 1680° C. of firing temperature is required to sinter it even by the hot pressing method.

As is apparent from the above facts, it is very difficult to integrally sinter the supporting member of $Si_3N_4$—$Al_2O_3$ and the heater of $Si_3N_4$—$MoSi_2$ of the conventional ceramic heater while exhibiting excellent properties of both members.

In the ceramic heater of which the supporting member and the heater are formed of the sintered bodies of $Si_3N_4$—$MoSi_2$ having equal composition to each other, the supporting member and the heater, each exhibiting excellent properties to its utmost limit, can be obtained by integrally sintering.

[Embodiment 3]

Figure 5:
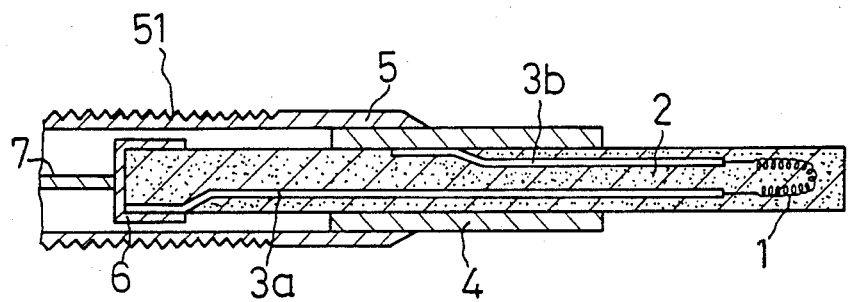
FIG. 5 is a sectional view of another embodiment of a glow plug wherein the sintered body according to the present invention is used as the supporting member.

In this embodiment, the sintered body of the present invention is applied to the supporting member of another tyoe of glow plug as shown in FIG. 5.

A heater 1 made of a resistance heating wire such as a tungsten fine wire is embedded in a tip end of a supporting member 2 and lead wires 3a, 3b made of tungsten of which tip ends are connected to the heater 1, are embedded in the supporting member 2.

The supporting member 2 is a sintered body formed by firing a mixed powder of 80 vol% of $Si_3N_4$ powder having an average particle diameter of 0.6 μm and 20 vol% of $MoSi_2$ powder having an average particle diameter of 0.9 μm with additives composed of $Y_2O_3$ and $Al_2O_3$ in an amount of 7 wt%, 3 wt%, respectively of the total amount of $Si_3N_4$ and $MoSi_2$.

The other structure of this embodiment is equal to that of the glow plug shown in FIG. 3 and accordingly the explanation thereof will be omitted.

The thermal shock resistance and the joining strength of the glow plug of this Embodiment, were tested under the same conditions as those of Embodiment 2.

And another glow plug having the same structure as the glow plug of Embodiment 3 except for that the supporting member is composed of a sintered body of only $Si_3N_4$, was tested similarly for comparison.

The test result of the thermal shock resistnace is shown in Table 6 and the test result of the joining strength is shown in Table 7. As is apparent from these test results, the glow plug of which the supporting member is made of a sintered body according to the present invention is excellent in both thermal shock resistance and the joining strength.

TABLE 1

| No. | PARTICLE DIAMETER OF $Si_3N_4$ ($\mu m$) | PARTICLE DIAMETER OF $MoSi_2$ ($\mu m$) | SINTERING AID & CONTENT (wt %) | SPESIFIC RESISTANCE ($\Omega \cdot cm$) | JUDGMENT |
|---|---|---|---|---|---|
| 1 | 1 | 4 | $Y_2O_3 = 4$, $Al_2O_3 = 2$ | $7.8 \times 10^2$ | |
| 2 | 1 | 4 | $Y_2O_3 = 4$, $Al_2O_3 = 4$ | $1.2 \times 10^9$ | O |
| 3 | 1 | 4 | $Y_2O_3 = 8$, $Al_2O_3 = 2$ | $2.3 \times 10^3$ | |
| 4 | 1 | 4 | $Y_2O_3 = 8$, $Al_2O_3 = 4$ | $7.0 \times 10^9$ | O |
| 5 | 1 | 0.9 | $Y_2O_3 = 4$, $Al_2O_3 = 2$ | $3.6 \times 10^2$ | |
| 6 | 1 | 0.9 | $Y_2O_3 = 4$, $Al_2O_3 = 4$ | $7.8 \times 10^8$ | O |
| 7 | 1 | 0.9 | $Y_2O_3 = 8$, $Al_2O_3 = 2$ | $5.9 \times 10^2$ | |
| 8 | 1 | 0.9 | $Y_2O_3 = 8$, $Al_2O_3 = 4$ | $1.2 \times 10^9$ | O |
| 9 | 0.6 | 4 | $Y_2O_3 = 4$, $Al_2O_3 = 2$ | $2.2 \times 10^3$ | |
| 10 | 0.6 | 4 | $Y_2O_3 = 4$, $Al_2O_3 = 4$ | $>10^{10}$ | O |
| 11 | 0.6 | 4 | $Y_2O_3 = 8$, $Al_2O_3 = 2$ | $5.5 \times 10^3$ | |
| 12 | 0.6 | 4 | $Y_2O_3 = 8$, $Al_2O_3 = 4$ | $>10^{10}$ | O |
| 13 | 0.6 | 0.9 | $Y_2O_3 = 4$, $Al_2O_3 = 2$ | $2.2 \times 10^3$ | |
| 14 | 0.6 | 0.9 | $Y_2O_3 = 4$, $Al_2O_3 = 4$ | $>10^{10}$ | O |
| 15 | 0.6 | 0.9 | $Y_2O_3 = 8$, $Al_2O_3 = 0$ | $1.7 \times 10^{-1}$ | |
| 16 | 0.6 | 0.9 | $Y_2O_3 = 8$, $Al_2O_3 = 1$ | $5.2 \times 10^1$ | |
| 17 | 0.6 | 0.9 | $Y_2O_3 = 8$, $Al_2O_3 = 2$ | $4.3 \times 10^3$ | |
| 18 | 0.6 | 0.9 | $Y_2O_3 = 8$, $Al_2O_3 = 3$ | $>10^{10}$ | O |
| 19 | 0.6 | 0.9 | $Y_2O_3 = 8$, $Al_2O_3 = 4$ | $>10^{10}$ | O |
| 20 | 0.6 | 0.9 | $Y_2O_3 = 8$, $MgAl_2O_4 = 1$ | $5.8 \times 10^4$ | |
| 21 | 0.6 | 0.9 | $Y_2O_3 = 8$, $MgAl_2O_4 = 2$ | $>10^{10}$ | O |
| 22 | 0.6 | 0.9 | $Y_2O_3 = 8$, $MgAl_2O_4 = 3$ | $>10^{10}$ | O |
| 23 | 0.6 | 0.9 | $Y_2O_3 = 8$, $MgAl_2O_4 = 4$ | $>10^{10}$ | O |
| 24 | 0.6 | 0.9 | $Y_2O_3 = 12$, $MgAl_2O_4 = 0$ | $2.0 \times 10^{-1}$ | |

TABLE 2

| No. | $Si_3N_4$ CONTENT (vol %) | $MoSi_2$ CONTENT (vol %) | SPECIFIC RESISTANCE ($\Omega \cdot cm$) |
|---|---|---|---|
| 25 | 100 | 0 | $>10^{10}$ |
| 26 | 95 | 5 | $>10^{10}$ |
| 27 | 90 | 10 | $>10^{10}$ |
| 28 | 85 | 15 | $>10^{10}$ |
| 29 | 80 | 20 | $>10^{10}$ |
| 30 | 75 | 25 | $6 \times 10^6$ |
| 31 | 70 | 30 | $2 \times 10^3$ |

TABLE 3

INVENTION

TABLE 4

| JOINING STRENGTH (kg) | 600  1,000  1,400 |
|---|---|
| SAMPLE FOR COMPARISON | ⟵⟶ |
| SAMPLE OF PRESENT INVENTION | ⟵⟶ |

TABLE 5

| | HEATER | | SUPPORTING MEMBER | | SAMPLE FOR COMPARISON (SUPPORTING MEMBER) | |
|---|---|---|---|---|---|---|
| COMPOSITION (vol %) | $82SI_3N_4$—$18MoSi_2$—$Y_2O_3$—$Al_2O_3$ | | | | $55Si_3N_4$—$45Al_2O_3$ | |
| MATERIAL | $Si_3N_4$ | $MoSi_2$ | $Si_3N_4$ | $MoSi_2$ | $Si_3N_4$ | $Al_2O_3$ |
| AVERAGE PARTICLE DIAMETER ($\mu m$) | 13 | 0.9 | 0.6 | 0.9 | 0.9 | 1.1 |
| FIRING TEMPERATURE (°C.) | DIFLECTIVE STRENGTH (kg/mm²) | THERMAL EXPANSION COEFFICIENT ($\times 10^{-6}$ deg$^{-1}$) | DIFLECTIVE STRENGTH (kg/mm²) | THERMAL EXPANSION COEFFICIENT ($\times 10^{-6}$ deg$^{-1}$) | DIFLECTIVE STRENGTH (kg/mm²) | THERMAL EXPANSION COEFFICIENT ($\times 10^{-6}$ deg$^{-1}$) |
| 1560 | 52.1 | 4.12 | 59.2 | 4.17 | 95.2 | 4.87 |
| 1600 | 73.5 | 4.17 | 67.1 | 4.16 | 85.7 | 4.52 |
| 1640 | 82.6 | 4.15 | 82.2 | 4.18 | 70.2 | 4.02 |
| 1680 | 92.1 | 4.13 | 93.3 | 4.13 | 59.5 | 3.47 |
| 1720 | 95.5 | 4.18 | 105.5 | 4.15 | 53.2 | 3.21 |
| 1760 | 93.2 | 4.14 | 104.2 | 4.14 | 55.3 | 3.23 |

| SPALLING TEMPERATURE (°C.) | 400 | 450 | 500 | 550 | 600 | 650 | 700 |
|---|---|---|---|---|---|---|---|
| SAMPLE FOR COMPARISON | O | X | X | X | X | X | X |
| SAMPLE OF PRESENT | O | O | O | O | O | O | O |

TABLE 6

| SPALLING TEMPERATURE (°C.) | 400 | 450 | 500 | 550 | 600 | 650 | 700 |
|---|---|---|---|---|---|---|---|
| SAMPLE FOR COMPARISON | O | O | O | X | X | X | X |
| SAMPLE OF PRESENT | O | O | O | O | O | O | O |

TABLE 6-continued

INVENTION

TABLE 7

| JOINING STRENGTH (kg) | 600  1,000  1,400 |
|---|---|
| SAMPLE FOR COMPARISON | ⟵⟶ |
| SAMPLE OF PRESENT INVENTION | ⟵⟶ |

What is claimed is:

1. An electrically insulating ceramic sintered body formed of 75 to 95 vol% of a basic material composed of at least one material selected from the group consisting of silicon nitride, aluminum nitride, and β-sialon, 25 to 5 vol% of an additive composed of at least one material selected from the group consisting of silicide, carbide, nitride, and boride of metal, said basic material having a particle diameter substantially equal to or smaller than that of said additive, said additive having a thermal expansion coefficient larger than that of said basic material, and a sintering aid composed of one alumina in an amount of 3 to 15 wt% of the total amount of said basic material and said additive, and spinel in an amount of 2 to 15 wt% of the total amount of said basic material and said additive; said sintered body having the structure that particles of said additive cohere and said cohering additive particles are dispersed in particles of said basic material so as to be surrounded by said particles of said basic material and separated from adjacent cohering additive particles by said particles of said basic material, and having a specific resistance of not less than $10^5$ Ωcm.

2. An electrically insulating ceramic sintered body according to claim 1, wherein said additive is at least one material selected from the group consisting of molybdenum silicide, titanium carbide, titanium nitride and zirconium boride.

3. A ceramic glow plug provided with a supporting member made of an electrically insulating ceramic sintered body, comprising:
a heater made of an electrically conductive ceramic and formed on a tip end of said supporting member which is formed like a rod, by integrally sintering;
lead wires embedded in said supporting member; a tip end of each of said lead wires being connected to said heater; and a housing for accommodatig and retaining said supporting member;
said supporting member being composed of a sintered body formed of silicon nitride and molybdenum silicide with one of alumina and spinel as said sintering aid; said silicon nitride having a particle diameter substantially equal to or smaller than that of said molybdenum silicide, said sintered body having the structure that particles of said molybdenum silicide cohere and said cohering molybdenum silicide particles are surrounded by particles of said silicon nitride to be separated from adjacent cohering molybdenum silicide particles by said silicon nitride particles, and dispersed therein;
said heater being mainly composed of a sintered body formed of silicon nitride and molybdenum silicide, having the same composition as that of said sintered body of said supporting member; and the particle diameter of said silicon nitride being larger than that of said molybdenum silicide; said sintered body of said heater having the structure that particles of said silicon nitride are surrounded by particles of said molybdenum silicide so as to be separated from each other.

4. A ceramic glow plug according to claim 3, wherein said sintered body of said supporting member is composed of 5 to 95 vol% of silicon nitride and 25 to 5 vol% of molybdenum silicide and has a specific resistance of not less than $10^5$ Ωcm, said sintered body of said heater has the same composition ratio as that of said supporting member, the amount of $Al_2O_3$ as said sintering aid is 3 to 15 wt% of the total amount of said silicon nitride and said molybdenum silicide, and the amount of spinel as said sintering aid is 2 to 15 wt% of the total amount of said silicon nitride and said molybdenum silicide.

5. A ceramic glow plug according to claim 3, wherein said supporting member is soldered to said housing through a nickel plating formed on a surface of said supporting member.

6. A ceramic glow plug provided with a supporting member made of an electrically insulating ceramic sintered body, comprising:
a heater made of a resistance heating wire embedded in a tip end of said supporting member which is formed like a rod;
lead wires embedded in said supporting member; a tip end of each of said lead wires being connected to said heater; and
a housing for accommodating and retaining said supporting member;
said supporting member being composed of a sintered body formed of silicon nitride and molybedenum silicide with one of alumina and spinel as said sintering aid, said silicon nitride having a particle diameter substantially equal to or smaller than that of said molybdenum silicide, said sintered body having the structure that particles of said molybdenum silicide cohere and said cohering molydbdenum silicide particles are surrounded by particles of said silicon nitride to be separated from adjacent cohering molybdenum silicide particles by said silicon nitride particles, and dispersed therein.

7. A ceramic glow plug according to claim 6, wherein said supporting member contains 75 to 95 vol% of silicon and has a specific resistance of not less than $10^5$ Ωcm nitride and 25 to 5 vol% of molybdenum silicide, the amount of alumina as said sintering aid is 3 to 15 wt% of the total amount of said silicon nitride and molybdenum silicide, and the amount of spinel as said sintering aid is 2 to 15 wt% of the total amount of said silicon nitride and said molybdenum silicide.

8. A ceramic glow plug according to claim 6, wherein said supporting member is soldered to said housing through a nickel plating formed on a surface of said supporting member.

* * * * *